United States Patent
Smith et al.

(10) Patent No.: US 9,612,937 B2
(45) Date of Patent: Apr. 4, 2017

(54) DETERMINING RELEVANT EVENTS IN SOURCE CODE ANALYSIS

(75) Inventors: Vincent C. Smith, Seattle, WA (US); Nathaniel E. Ayewah, Seattle, WA (US); Donn S. Terry, Woodinville, WA (US); Yue Yang, Redmond, WA (US); David J. Sielaff, Seattle, WA (US); Mansi S. Rajkondawar, Redmond, WA (US); Sunny Chatterjee, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 13/604,495

(22) Filed: Sep. 5, 2012

(65) Prior Publication Data

US 2014/0068567 A1 Mar. 6, 2014

(51) Int. Cl.
*G06F 9/44* (2006.01)
*G06F 11/36* (2006.01)

(52) U.S. Cl.
CPC ......... *G06F 11/3636* (2013.01); *G06F 8/75* (2013.01); *G06F 9/444* (2013.01); *G06F 11/36* (2013.01); *G06F 11/362* (2013.01); *G06F 11/3668* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 7,685,471 B2 | 3/2010 | Rajan et al. | |
| 7,707,552 B2 | 4/2010 | Schmidt et al. | |
| 2007/0016894 A1 | 1/2007 | Sreedhar | |
| 2008/0244536 A1 | 10/2008 | Farchi et al. | |
| 2010/0269101 A1* | 10/2010 | Jirman | G06F 11/00 717/125 |
| 2010/0333069 A1 | 12/2010 | Chandra et al. | |
| 2011/0161938 A1 | 6/2011 | Marum et al. | |
| 2012/0317554 A1* | 12/2012 | Mulat | 717/131 |
| 2013/0031531 A1* | 1/2013 | Keynes et al. | 717/126 |

OTHER PUBLICATIONS

Ayewah, et al., "Evaluating Static Analysis Defect Warnings on Production Software", Retrieved at, Program Analysis for Software Tools and Engineering 2007, Jun. 13-14, 2007, pp. 7.

Nagappan, et al., "Preliminary Results on Using Static Analysis Tools for Software Inspection", Retrieved at, 15th International Symposium on Software Reliability Engineering (ISSRE'04), Nov. 2004, pp. 429-439.

* cited by examiner

*Primary Examiner* — Lewis A Bullock, Jr.
*Assistant Examiner* — Mark Gooray

(57) ABSTRACT

In embodiments of determining relevant events in source code analysis, a computing device includes a key event manager that is implemented to traverse executable paths in source code of executable software instructions, log events along the executable paths in the source code, and determine a defect in the source code along an executable path in the source code. A state machine is implemented to traverse back through the logged events and determine relevant events that are associated with the defect in the source code. An analysis output of the relevant events can then be generated to indicate the defect in the source code and a cause of the defect.

20 Claims, 6 Drawing Sheets

DETERMINING RELEVANT EVENTS IN SOURCE CODE ANALYSIS

BACKGROUND

Static code analysis is used to test and verify source code when developing software by checking for errors and defect patterns in the source code. A static code analysis tool (analyzer) can be automated to select code branches and test the many individual statements, variables, loops, and other aspects of source code to test and verify the source code. Typically, an output of an analyzer can be difficult for a software developer to understand as it relates to determining the cause of a source code error or defect. An analyzer output may only include very little information about how an error or defect was determined and/or too much irrelevant information that obscures the pertinent events a developer wants to identify to fix a source code error or defect. These types of analyzer outputs can be a frustrating experience and very time consuming for a developer to filter through.

SUMMARY

This Summary introduces simplified concepts of determining relevant events in source code analysis, and the concepts are further described below in the Detailed Description and/or shown in the Figures. This Summary should not be considered to describe essential features of the claimed subject matter, nor used to determine or limit the scope of the claimed subject matter.

Determining relevant events in source code analysis are described. In embodiments, a computing device includes a key event manager that is implemented to traverse executable paths in source code of executable software instructions, log events along the executable paths in the source code, and determine a defect in the source code along an executable path in the source code. A state machine is implemented to traverse back through the logged events and determine relevant events that are associated with the defect in the source code. An analysis output of the relevant events can then be generated to indicate the defect in the source code and a cause of the defect.

In embodiments, the state machine is also implemented to discard non-relevant events of the logged events, as well as determine related relevant events associated with the defect in the source code, and merge the related relevant events as a single relevant event. Not all of the relevant events may contribute to the defect in the source code, and the state machine can be implemented filter out redundant relevant events and determine which of the relevant events contribute to a duplicate defect in the source code. In embodiments, each of the relevant events has an associated tag that indicates at least a type of the event, an importance of the event, and a message to explain the event.

In embodiments, the state machine is extensible to add additional types of the events that are utilized to determine the relevant events associated with the defect in the source code. In implementations, the events can be generated for different types of the events, including: an alias event that indicates at least two variables correspond to a same reference; a branch event that indicates a change of executable paths in the source code; a declaration event that indicates an operation on a variable; and a failed-assertion event that indicates the defect in the source code.

BRIEF DESCRIPTION OF THE DRAWINGS

Embodiments of determining relevant events in source code analysis are described with reference to the following Figures. The same numbers may be used throughout to reference like features and components that are shown in the Figures.

DETAILED DESCRIPTION

Embodiments of determining relevant events in source code analysis are described and can be implemented to provide a developer with the information needed to understand a source code defect. The information includes implicit facts and assumptions that are not necessarily used during analysis of the source code, but are useful for user understanding of the cause of a defect. In embodiments, a state machine is implemented to traverse through logged events and determine relevant events that are associated with the defect in the source code. The state machine can then identify not only the defect in the source code, but also a cause of the defect.

Source code analysis generates the events, which can include relevant events that are associated with a defect in the source code, and non-relevant events that are discarded. The relevant events can include related relevant events, such as events that occur together, typically on the same statement on an analysis path in the source code, and the related events are merged together as a single relevant event for conciseness. The relevant events can also include redundant relevant events, which may occur as branch events and can be determined from duplicate defects, such as on alternate analysis paths in the source code.

While features and concepts of determining relevant events in source code analysis can be implemented in any number of different devices, systems, networks, environments, and/or configurations, embodiments of determining relevant events in source code analysis are described in the context of the following example devices, systems, and methods.

Figure 1:
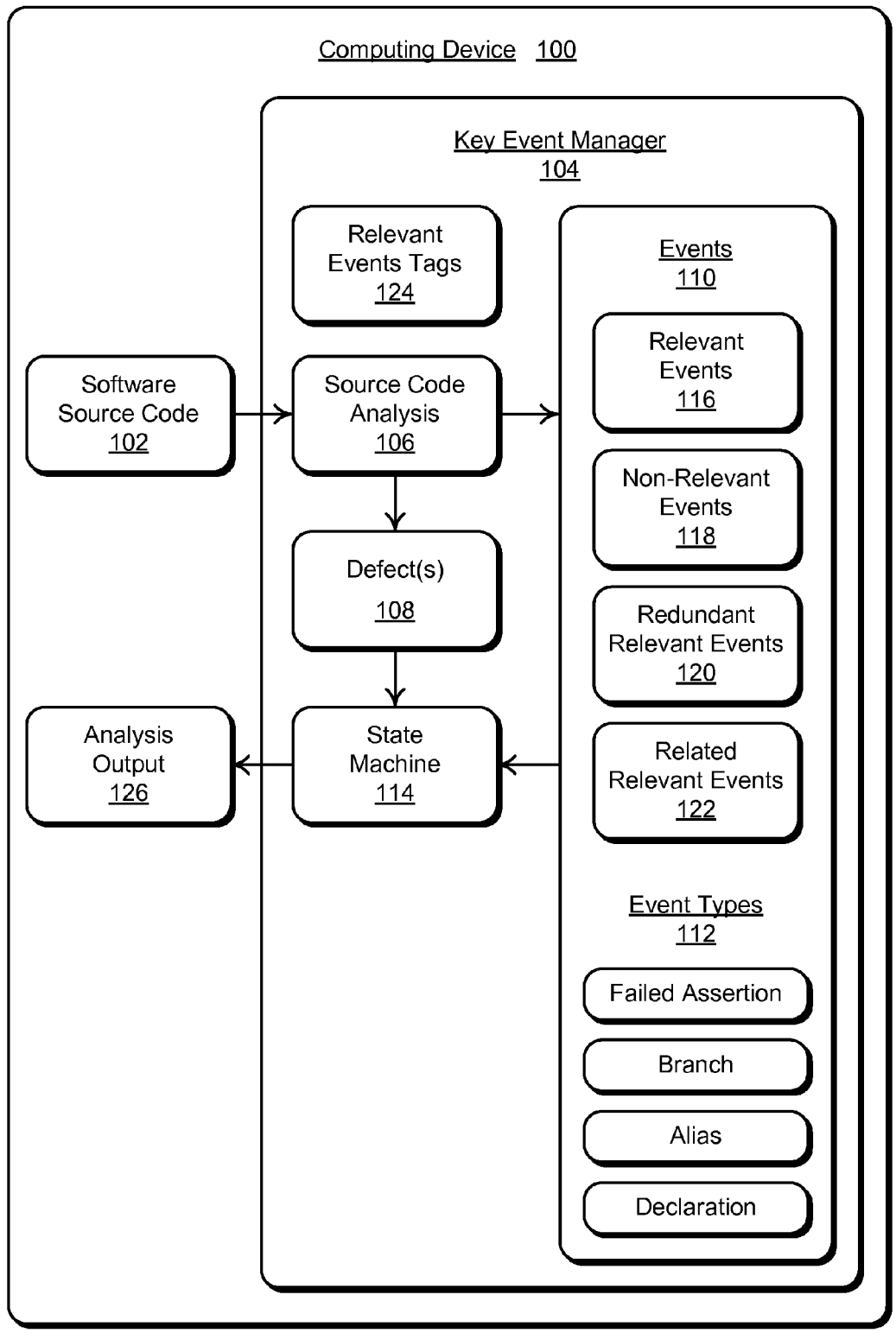
FIG. 1 illustrates an example computing device in which embodiments of determining relevant events in source code analysis can be implemented.

FIG. 1 illustrates an example computing device 100 in which embodiments of determining relevant events in source code analysis can be implemented. The example computing device 100 may be any type of a wired and/or wireless device, such as a computer, server, dedicated machine, state machine, and any other type of electronic and/or computing device. Any of the devices described herein can be implemented with various components, such as a processor and/or memory system, as well as any number and combination of differing components as further described with reference to the example device shown in FIG. 6 to implement embodiments of determining relevant events in source code analysis.

In this example, the computing device 100 includes software source code 102, such as source code that is executable software instructions developed by one or more developers and maintained in memory. In embodiments, a key event manager 104 includes a component for source code analysis 106 of the source code. The source code analysis 106 is implemented, and can be initiated by the key event manager, to traverse executable paths in the source code 102 to check for defects 108 in the source code, such as by selecting code branches and testing the many individual statements, variables, loops, and other aspects to verify the source code. Various defects in source code can include a buffer overrun, uninitialized memory, an uninitialized variable, and any other type of source code error or defect.

The key event manager 104 is implemented to log events 110 that occur during the static code analysis along the executable paths in the source code. In embodiments, the events are logged and used to determine events that are relevant to a user from the analysis. The events 110 can include different event types 112, such as an alias event that indicates at least two variables correspond to a same reference; a branch event that indicates a change of executable paths in the source code 102 (e.g., control flow switch changes); a declaration event that indicates an operation on a variable (e.g., an uninitialized variable, an integer variable value of zero); and a failed-assertion event that indicates a determined defect in the source code. Other types of events include a function event that indicates where a function call is initiated in the source code, and includes the input and/or output parameters of the function.

The key event manager 104 includes a state machine 114 that can be initiated to traverse back through the logged events 110 and determine relevant events 116 that are associated with a defect 108 (i.e., a failed assertion) in the source code. An example of the state machine 114 is shown and described with reference to FIG. 2. In embodiments, the state machine is implemented to determine which of the relevant events contribute to a duplicate defect in the source code, discard non-relevant events 118 of the logged events 110, and filter out redundant relevant events 120. The source code analysis 106 generates the events 110, which can include the relevant events 116 that are associated with a defect in the source code, and the non-relevant events 118 are discarded.

The redundant relevant events may occur as branch events and can be determined from duplicate defects, such as on alternate analysis paths in the source code. For example, a first redundant relevant event 120 may be associated with a defect 108 as determined along an executable path in the source code 102, and a second redundant relevant event is associated with the defect as determined along a different executable path in the source code. For example, if a defect occurs whether a branch of the source code is analyzed or skipped, then it is likely that events generated from an analysis of the branch will not provide or contribute to a user understanding of a defect (i.e., although the branch is on the path, and relevant, it does not provide the user useful information because the defect occurs on either side of the branch). Although a branch event may be relevant to the analysis, it can be determined as redundant because the analysis would have reached the same result if a different branch decision is selected for analysis. This can be implemented as post processing, in that after defect is determined, along with the associated relevant events and the related relevant events that are merged, the defect can be revisited on an alternate path when the defect occurs again. A determination can then be made that some of the relevant events are redundant, or do not contribute to the defect.

The state machine 114 is also implemented to determine related relevant events 122 that are associated with a defect 108 in the source code and merge the related relevant events as a single relevant event. The related relevant events can occur on the same statement on an analysis path in the source code, and the related events are merged together as a single relevant event for conciseness. The state machine 114 is also extensible to add additional event types 112 that are utilized to determine the relevant events 116 that are associated with a defect in the source code.

In embodiments, the key event manager 104 is implemented to generate relevant events tags 124, where each of the relevant events 116 has an associated tag that indicates a type of the event, an importance of the event, and a message to explain the event. In implementations, the message to explain an event may be a text message or email message that is communicated to a developer of the software source code. The relevant events tags can be utilized as group tags that are a searchable attribute of the events to identify and/or filter the event types. For example, a user may select not to include the branch event types in an analysis output, and can filter out the branch events by the relevant events tags.

The key event manager 104 can also generate an analysis output 126 of the relevant events 116 that are associated with a defect 108 in the source code 102, and to indicate a cause of the defect. The analysis output 126 can be sent to an output log file, and optionally, may be printed and/or displayed so that a developer can use the analysis output to determine the cause of a source code error or defect.

Although the key event manager 104 is shown and described to include the source code analysis 106 and the state machine 114, the source code analysis, and/or the state machine may be implemented as independent components of the key event manager and/or of the computing device 100. Alternatively or in addition, the key event manager, the source code analysis, and/or the state machine can all be implemented independent of the computing device, such as in a networked service environment as shown and described with reference to FIG. 4.

Figure 2:
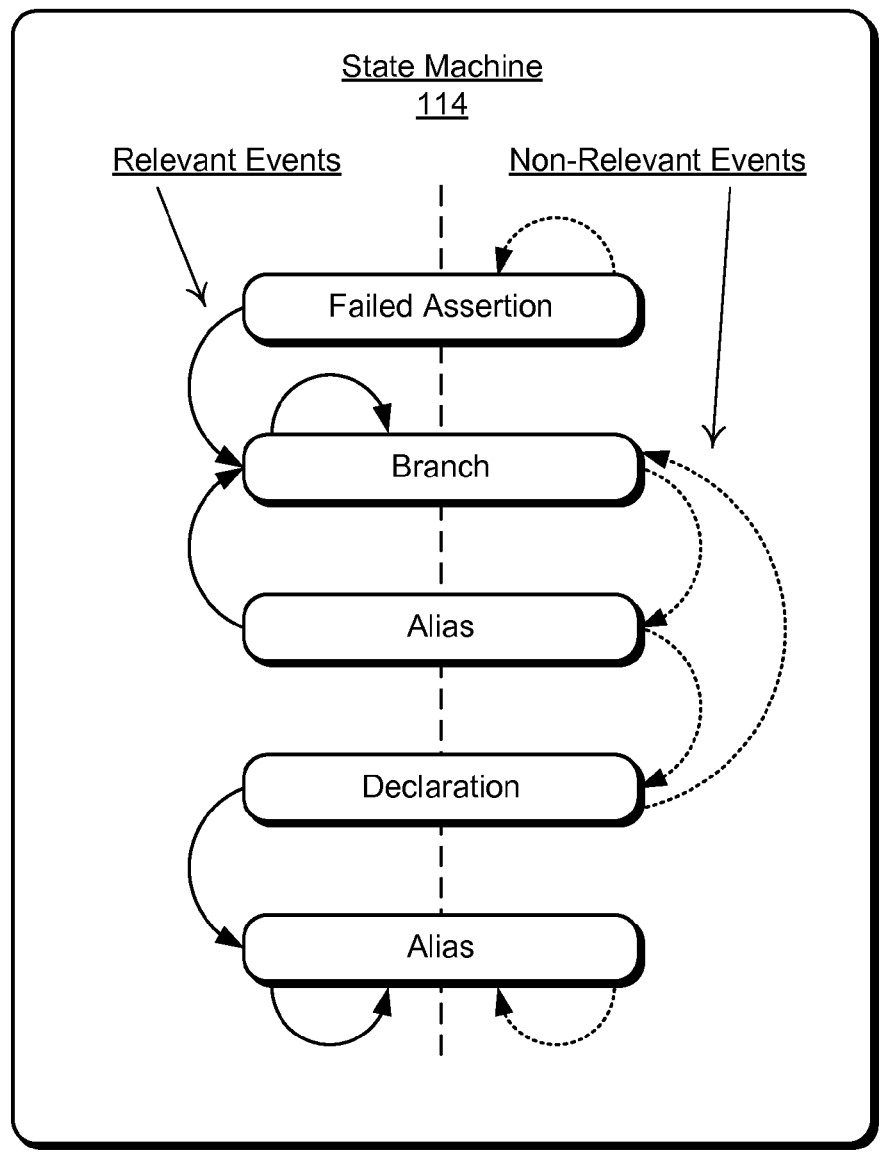
FIG. 2 illustrates an example state machine to implement embodiments of determining relevant events in source code analysis.

FIG. 2 illustrates an example of the state machine 114 to implement embodiments of determining relevant events in source code analysis. As described with reference to FIG. 1, the state machine 114 is implemented to traverse back through the logged events 110 starting from a defect 108 (i.e., a failed assertion) in the source code and determine relevant events 116 that are associated with the defect based on the class or type of an event. In an embodiment, the event types 112 utilized by the state machine include a failed assertion, branch events, alias events, and declaration events. If a relevant event is determined, the state machine transitions via a relevant association of event types. In this example, the relevant events 116 are indicated as associations of the event types, as shown by the solid-line transition arrows at the left of the state machine. If an event is determined to be non-relevant, the state machine transitions via a non-relevant association of event types. In this example, the non-relevant events 118 are indicated as associations of the event types, as shown by the dotted-line transition arrows at the right of the state machine.

In implementations, the state machine 114 can also traverse a path in reverse as it transitions between states, whereby some state transitions are accompanied by a corresponding traversal to the next (previous) statement in the path (e.g., the next tree). This traversal may depend on the state that the state machine is in, and the determination of a relevant or non-relevant event is based on the current state for the current statement. This precludes the state machine from continuing infinitely, and the state machine stops when it reaches the end of the path (i.e., the first statement).

The state machine 114 traverses through the logged events 110 starting from a failed assertion (i.e., shown at the top of the illustration), recursive through the branch events and/or the alias events to determine a relevant declaration event. The state machine then searches for an additional alias event (i.e., shown at the bottom of the illustration), and generates an output that indicates whether the event is relevant to a source code defect. As noted, the defects that are determined by the source code analysis 106 are not immediately reported out, but rather queued until the state machine 114 can determine and filter the redundant relevant events 120. For example, a conventional analyzer may determine a defect and then report out the error. If the same problem is again determined on a different executable path through the source code, the conventional analyzer will discard the subsequent error warnings. Alternatively, the state machine 114 is implemented to detect events that generate a warning, and then compare a detected event to other logged events, such as to filter out branch events that may be non-relevant or redundant.

Figure 3:
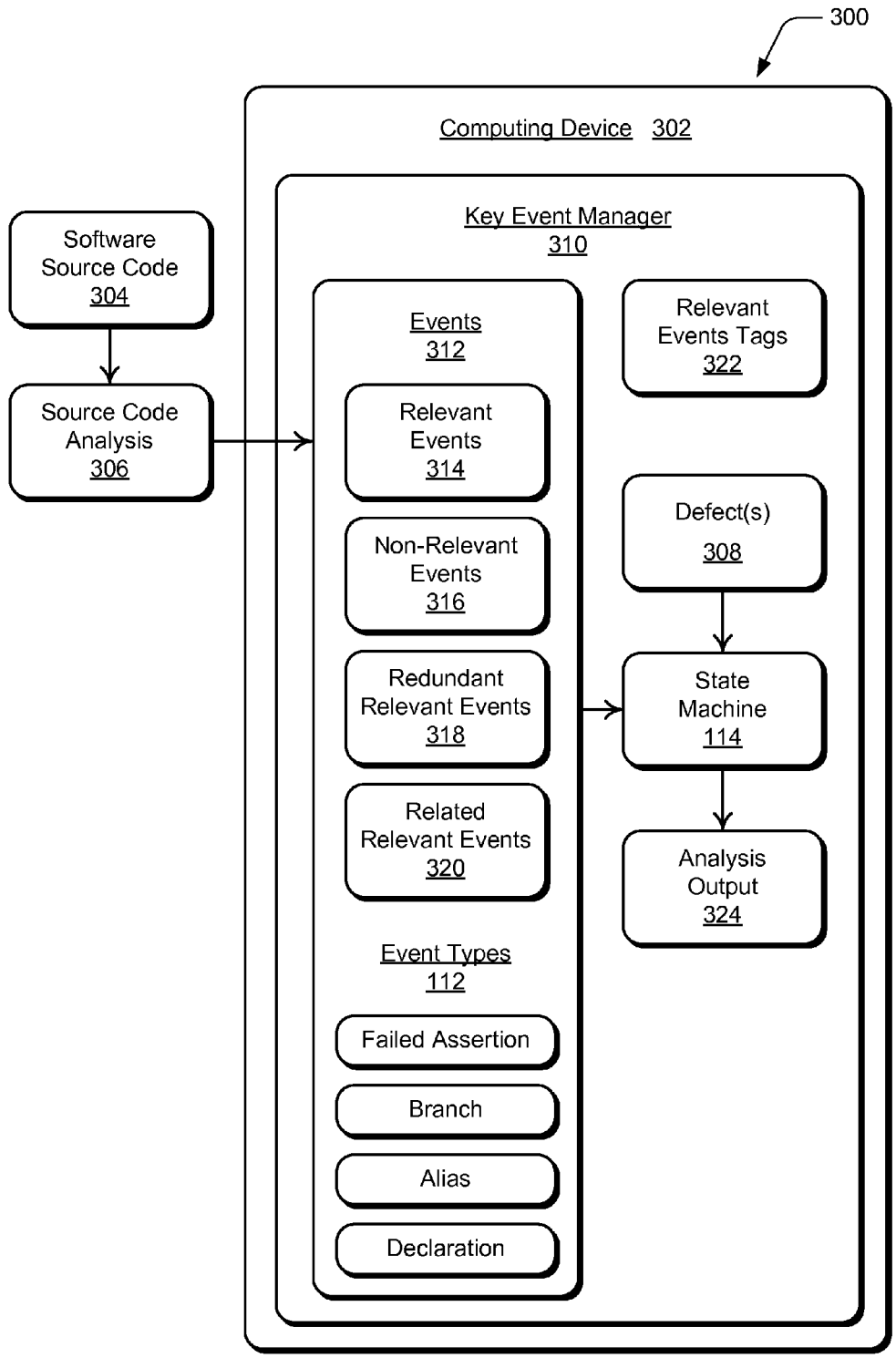
FIG. 3 illustrates a system with another example computing device in which embodiments of determining relevant events in source code analysis can be implemented.

FIG. 3 illustrates a system 300 with another example computing device 302 in which embodiments of determining relevant events in source code analysis can be implemented. The example computing device 302 may also be any type of a wired and/or wireless device, such as a computer, server, dedicated machine, state machine, and any other type of electronic and/or computing device. In this example system, software source code 304 (e.g., executable software instructions) is evaluated by source code analysis 306. The source code analysis 306 traverses executable paths in the source code 304 to check for and determine defects 308 in the source code. In this example, the computing device 302 includes a key event manager 310, similar to the key event manager 104 described with reference to FIG. 1. The key event manager 310 is implemented to log events 312 that occur during the static code analysis 306 along the executable paths in the source code.

As described with reference to FIG. 1, the logged events 312 can include the different event types 112, such as an alias event that indicates at least two variables correspond to a same reference; a branch event that indicates a change of executable paths in the source code; a declaration event that indicates an operation on a variable; and a failed-assertion event that indicates a determined defect in the source code. The key event manager 310 includes the state machine 114 that can be initiated to traverse back through the logged events 312 and determine relevant events 314 that are associated with a defect 308 (i.e., a failed assertion) in the source code. In embodiments, the state machine is implemented to determine which of the relevant events contribute to a duplicate defect in the source code, discard non-relevant events 316 of the logged events 312, and filter out redundant relevant events 318.

The state machine 114 is also implemented to determine related relevant events 320 that are associated with a defect 308 in the source code and merge the related relevant events as a single relevant event. The key event manager 310 is also implemented to generate the relevant events tags 322, where each of the relevant events 314 has an associated tag that indicates at least a type of the event, an importance of the event, and a message to explain the event. In implementations, the message to explain an event may be a text message or email message that is communicated to a developer of the software source code. The key event manager 310 can also generate an analysis output 324 of the relevant events 314 that are associated with a defect 308 in the source code 304, and to indicate a cause of the defect.

Figure 4:
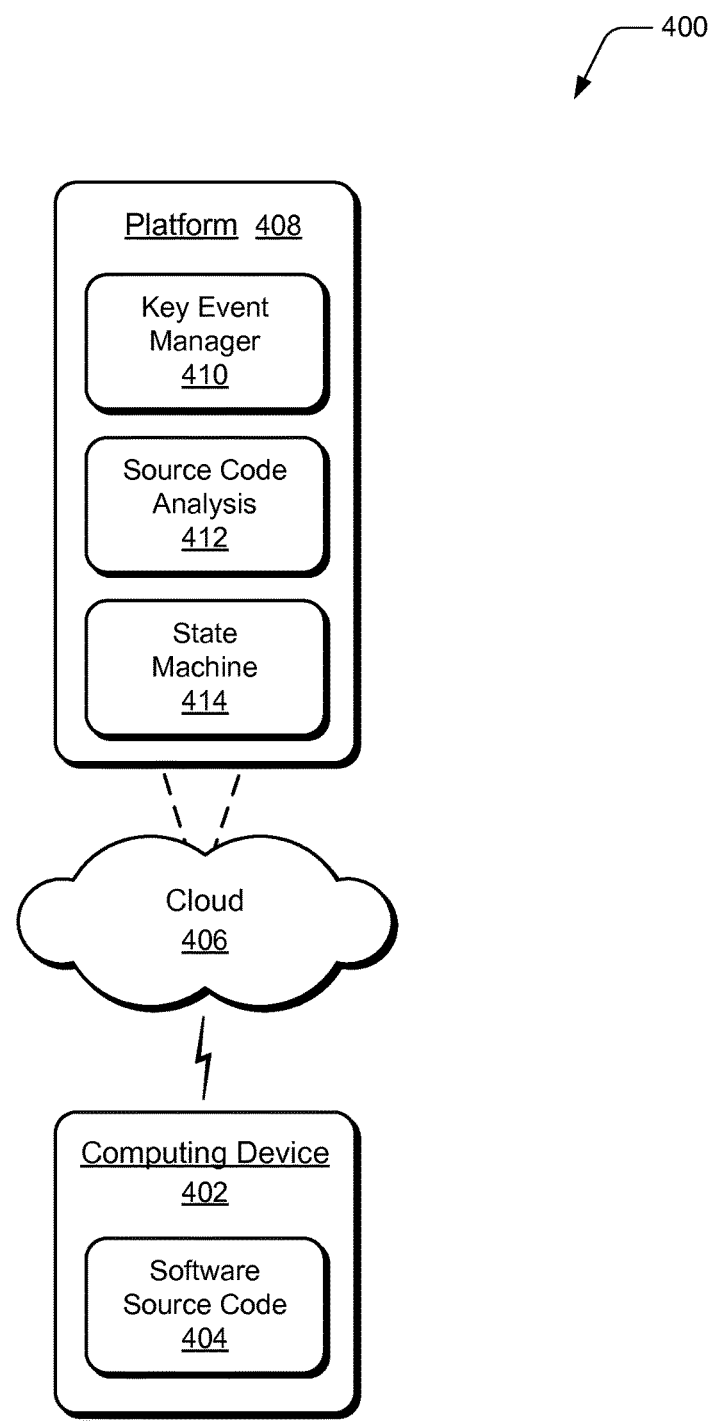
FIG. 4 illustrates an example system in which embodiments of determining relevant events in source code analysis can be implemented.

FIG. 4 illustrates an example system 400 that includes a computing device 402, such as the computing device 100 or the computing device 302 as described with reference to respective FIGS. 1 and 3. The computing device 402 includes software source code 404, such as the source code 102 or the source code 304 described with reference to respective FIGS. 1 and 3. The software source code 404 is an example of executable software instructions developed by one or more developers on one or more computing devices. In the example system 400, multiple devices can be interconnected through a central computing device or system, which may be local to the multiple devices or may be located remotely from the multiple devices.

In embodiments, the central computing device may be a cloud 406 of one or more server computers that are connected to the multiple devices through a network, the Internet, or other data communication link. In embodiments, this interconnection architecture enables functionality across multiple devices to provide a networked service environment of the multiple devices. Each of the devices may have different physical configurations and capabilities, and the central computing device can utilize a platform 408 to implement a key event manager 410, source code analysis 412, and/or a state machine 414 to implement embodiments of determining relevant events in source code analysis. Examples of the key event manager, source code analysis, and the state machine are described with reference to similar components shown in FIGS. 1-3.

The cloud 406 includes and/or is representative of the platform 408 for the networked service components (i.e., the key event manager, source code analysis, and the state machine) that implement embodiments of determining relevant events in source code analysis. The platform abstracts underlying functionality of hardware, such as server devices, and/or software resources of the cloud. The networked service components may include applications and/or data that can be utilized while computer processing is executed on servers that are remote from the computing device 402.

Example method 500 is described with reference to FIG. 5 in accordance with one or more embodiments of determining relevant events in source code analysis. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
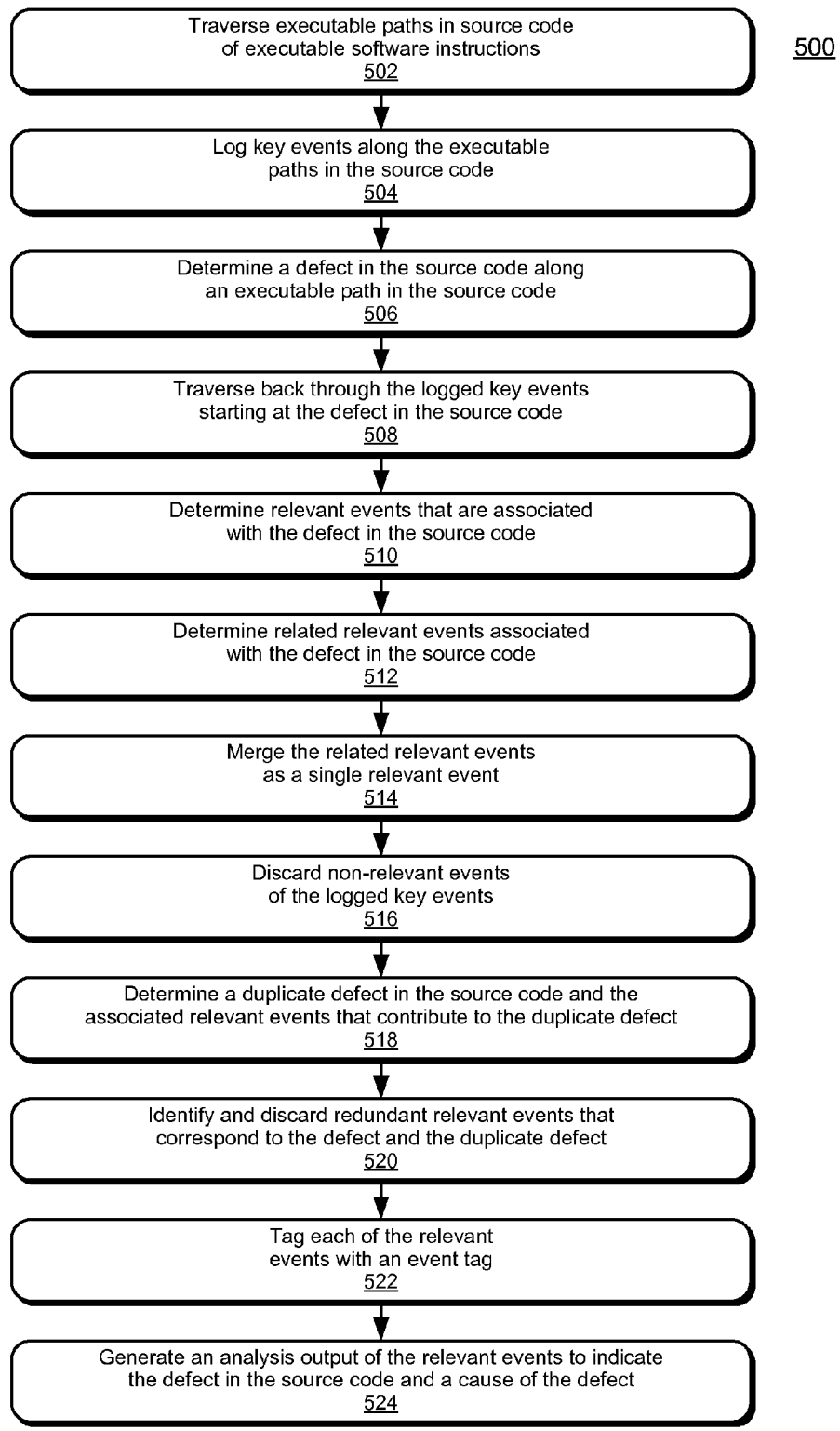
FIG. 5 illustrates example method(s) of determining relevant events in source code analysis in accordance with one or more embodiments.

FIG. 5 illustrates example method(s) 500 of determining relevant events in source code analysis. The order in which the method blocks are described are not intended to be construed as a limitation, and any number of the described method blocks can be combined in any order to implement a method, or an alternate method.

At block 502, executable paths are traversed in source code of executable software instructions. For example, the source code analysis 106 is initiated by the key event manager 104 at the computing device 100 (FIG. 1), and the source code analysis traverses executable paths in the source code 102 to check for defects 108 in the source code, such as by selecting code branches and testing the many individual statements, variables, loops, and other aspects to verify the source code. Similarly, the source code analysis 306 (FIG. 3) traverses executable paths in the source code 304 to check for defects 308 in the source code, and the source code analysis 412 in the platform 408 (FIG. 4) traverses executable paths in the source code 404 at the computing device 402 to check for defects in the source code.

At block 504, events along the executable paths in the source code are logged. For example, the key event manager 104 at the computing device 100 logs the events 110 that occur during static code analysis along the executable paths in the source code 102. Similarly, the key event manager 310 at the computing device 302 logs the events 312 that occur during static code analysis of the source code 304, and the key event manager 410 in the platform 408 logs events that occur during static code analysis of the source code 404 at the computing device 402. In implementations, the events are generated for the different event types 112, which include alias events that indicate at least two variables correspond to a same reference; branch events that indicate a change of executable paths in the source code; declaration events that indicate an operation on a variable; and failed-assertion events that indicate defects in the source code.

At block 506, a defect is determined in the source code along an executable path in the source code. For example, the source code analysis 106 at the computing device 100 determines a defect 108 in the source code 102 along an executable path in the source code. Similarly, the source code analysis 306 determines a defect 308 in the source code 304 along an executable path in the source code, and the source code analysis 412 in the platform 408 determines a defect in the source code 404 at the computing device 402.

At block 508, the logged events are traversed back through starting at the defect in the source code and, at block 510, relevant events that are associated with the defect in the source code are determined. For example, the state machine 114 at the computing device 100 traverses back through the logged events 110 and determines the relevant events 116 that are associated with a defect 108 (i.e., a failed assertion) in the source code 102. Similarly, the state machine 114 at the computing device 302 traverses back through the logged events 312 and determines the relevant events 314 that are associated with a defect 308 (i.e., a failed assertion) in the source code 304. Similarly, the state machine 414 in the platform 408 traverses back through logged events and determines the relevant events that are associated with a defect (i.e., a failed assertion) in the source code 404.

At block 512, related relevant events associated with the defect in the source code are determined and, at block 514, the related relevant events are merged as a single relevant event. For example, the state machine 114 at the computing device 100 determines the related relevant events 122 associated with a defect 108 in the source code 102 and merges the related relevant events as a single relevant event. Similarly, the state machine 114 at the computing device 302 determines the related relevant events 320 associated with a defect 308 in the source code 304 and merges the related relevant events as a single relevant event. Similarly, the state machine 414 in the platform 408 determines related relevant events associated with a defect in the source code 404 and merges the related relevant events as a single relevant event.

At block 516, non-relevant events of the logged events are discarded. For example, the state machine 114 at the computing device 100 discards the non-relevant events 118 of the logged events 110. Similarly, the state machine 114 at the computing device 302 discards the non-relevant events 316 of the logged events 312, and the state machine 414 in the platform 408 discards non-relevant events of logged events associated with the analysis of the source code 404 at the computing device 402.

At block 518, one or more of the relevant events that contribute to a duplicate defect in the source code are determined. For example, the state machine 114 at the computing device 100 determines the relevant events 116 that contribute to a duplicate defect in the source code 102. Similarly, the state machine 114 at the computing device 302 determines the relevant events 314 that contribute to a duplicate defect in the source code 304, and the state machine 414 in the platform 408 determines relevant events that contribute to a duplicate defect in the source code 404 at the computing device 402.

At block 520, redundant relevant events that correspond to the defect and the duplicate defect are identified and discarded. For example, the state machine 114 at the computing device 100 identifies and discards the redundant relevant events 120 that correspond to the defect (e.g., determined at block 506) and the duplicate defect (e.g., determined at block 518). Similarly, the state machine 114 at the computing device 302, as well as the state machine 414 in the platform 408, identifies and discards the redundant relevant events 318 that correspond to the defect and the duplicate defect.

At block 522, each of the relevant events are tagged with an event tag that indicates a type of the event, an importance of the event, and a message to explain the event. For example, the key event manager 104 at the computing device 100 tags each of the relevant events 116 with a relevant event tag 124 that indicates a type of the event, an importance of the event, and a message to explain the event. In implementations, the message to explain an event may be a text message or email message that is communicated to a developer of the software source code. Similarly, the key event manager 310 at the computing device 302 tags each of the relevant events 314 with a relevant event tag 322, and the key event manager 410 in the platform 408 tags the determined relevant events with a relevant event tag.

At block 524, an analysis output of the relevant events is generated to indicate the defect in the source code and a cause of the defect. For example, the key event manager 104 at the computing device 100 generates the analysis output 126 of the relevant events 116 that are associated with a defect 108 in the source code 102, and to indicate a cause of the defect. Similarly, the key event manager 310 at the computing device 302 generates the analysis output 324 of the relevant events 314 that are associated with a defect 308 in the source code 304, and to indicate a cause of the defect. Similarly, the key event manager 410 in the platform 408 generates an analysis output of relevant events that are associated with a defect in the source code 404 at the computing device 402.

Figure 6:
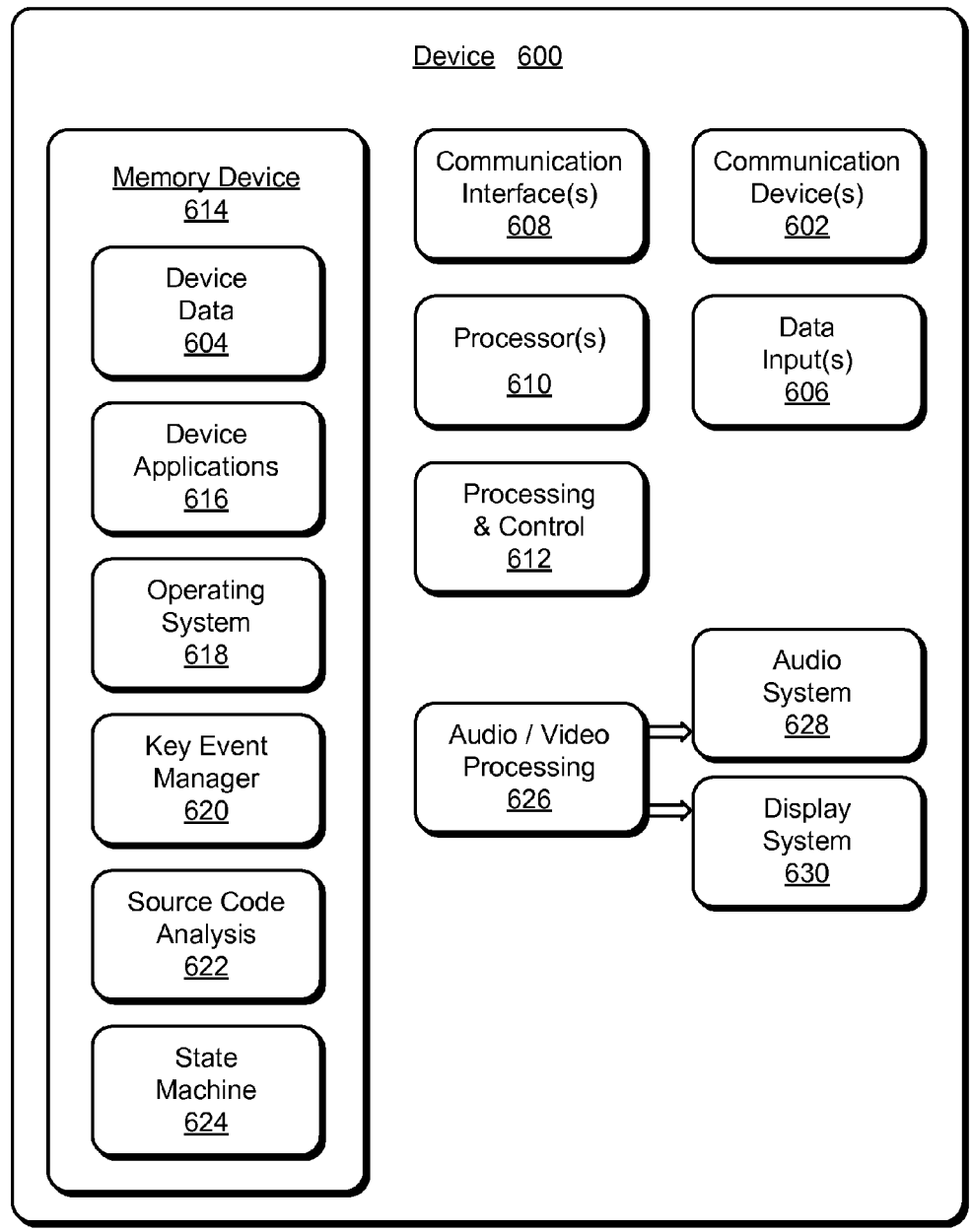
FIG. 6 illustrates various components of an example device that can implement embodiments of determining relevant events in source code analysis.

FIG. 6 illustrates various components of an example device 600 that can be implemented as any of the computing devices described with reference to the previous FIGS. 1-5, such as any type of a computer, server, dedicated machine, state machine, and any other type of electronic and/or computing device. The device may also be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as the software source code, the events, the relevant event tags, and the analysis outputs. The device 600 also includes one or more data inputs 606 via which any type of data, media content, and/or inputs can be received, such as user-selectable inputs and any other type of audio, video, and/or image data received from any content and/or data source. The data inputs 606 may include USB ports, coaxial cable, and other serial or parallel connectors (including internal connectors) for flash memory, DVDs, CDs, and the like. The data inputs can be used to couple the device to components, peripherals, and accessories, such as keyboards, microphones, cameras, and any other type of devices.

The device 600 also includes communication interfaces 608, such as any one or more of a serial, parallel, network, or wireless interface. The communication interfaces provide a connection and/or communication links between the device and a communication network by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 includes one or more processors 610 (e.g., any of microprocessors, controllers, and the like) or a processor and memory system (e.g., implemented in an SoC), which processes computer-executable instructions to control the operation of the device. Alternatively or in addition, the device can be implemented with any one or combination of software, hardware, firmware, or fixed logic circuitry that is implemented in connection with processing and control circuits which are generally identified at 612.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 614 provides data storage mechanisms to store the device data 604, other types of information and/or data, and device applications 616. For example, an operating system 618 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include a key event manager 620, source code analysis 622, and a state machine 624 that implement embodiments of determining relevant events in source code analysis.

Examples of the key event manager 620, source code analysis 622, and a state machine 624 are shown and described with reference to FIGS. 1-5. Although shown implemented as software applications or modules in the example device 600, the key event manager 620, source code analysis 622, and/or a state machine 624 may be implemented in the general context of software, firmware, hardware (e.g., fixed logic circuitry), or any combination thereof.

The device 600 may also include an audio and/or video processing system 626 that generates audio data for an audio system 628 and/or generates display data for a display system 630. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Although embodiments of determining relevant events in source code analysis have been described in language specific to features and/or methods, the appended claims are not necessarily limited to the specific features or methods described. Rather, the specific features and methods are disclosed as example implementations of determining relevant events in source code analysis.

The invention claimed is:

1. A computing device, comprising:
source code of executable software instructions;
a memory and processor system to implement a key event manager that is configured to:
 traverse executable paths in the source code;
 log events along the executable paths in the source code;
 determine a defect in the source code along an executable path in the source code; and
initiate a state machine that includes multiple states corresponding to different types of the events, the state machine configured to:
 traverse back through the logged events and determine relevant and non-relevant events that are associated with the defect in the source code, the traversing back through the logged events being based on a current state of the state machine as the state machine traverses back through the logged events, and further the traversing starting from the defect in the source code and traversing the executable path in reverse order through the different types of the events including: branch events, alias events, and declaration events to determine one or more relevant declaration events and an associated alias event, an alias event indicating at least two variables corresponding to a particular reference, a branch event indicating a change of the executable path in the source code, and a declaration event indicating an operation on a variable;
 transition states of the state machine during the traversing in response to determining that the event type in the traversed executable paths is a relevant event having a relevant association to the defect or a non-relevant event having a non-relevant association to the defect in the source code;
 determine which of the relevant events are redundant relevant events contributing to a duplicate defect in the source code;

filter the logged events to discard the redundant relevant events and the non-relevant events from the relevant events; and generate an analysis output of the filtered relevant events to indicate the defect in the source code and a cause of the defect.

2. A computing device as recited in claim 1, wherein:

a first redundant relevant event is associated with the defect as determined along the executable path in the source code; and at least a second redundant relevant event is associated with the defect as determined along a different executable path in the source code.

3. A computing device as recited in claim 1, wherein the events are generated for the different types of the events, comprising:

the alias event that indicates the at least two variables correspond to the particular reference;

the branch event that indicates the change of executable paths in the source code;

the declaration event that indicates the operation on the variable; and a failed-assertion event that indicates the defect in the source code.

4. A computing device as recited in claim 3, wherein the state machine is extensible to add additional types of the events that are utilized to determine the relevant events associated with the defect in the source code.

5. A computing device as recited in claim 1, wherein the state machine is further configured to add additional types of the events that are utilized to determine the relevant events associated with the defect in the source code.

6. A computing device as recited in claim 1, wherein the key event manager is further configured to:

generate a tag for each of the relevant events that indicates at least a type of the event, an importance of the event, and a message to explain the event;

communicate the message to explain the event to a developer of the source code, the message being a text message or an email message; and filter, prior to the analysis output of the relevant events generated, one or more event types from the relevant events based on the type of the event indicated in the tag for each of the relevant events.

7. A computing device as recited in claim 1, wherein the key event manager is further configured to:

initiate a state machine to determine related relevant events associated with the defect in the source code; and merge the related relevant events together as a single relevant event.

8. A computer-implemented method, comprising:

traversing executable paths in source code of executable software instructions;

logging events along the executable paths in the source code;

determining a defect in the source code along an executable path in the source code;

determining relevant and non-relevant events that are associated with the defect in the source code by traversing back through the logged events using a state machine that includes multiple states corresponding to different types of the events, the the traversing back through the logged events being based on a current state of the state machine as the state machine traverses back through the logged events, and further the traversing starting at the defect in the source code and traversing the executable path in reverse order through the different types of the events including: branch events, alias events, and declaration events to determine one or more relevant declaration events and an associated alias event, an alias event indicating at least two variables corresponding to a particular reference, a branch event indicating a change of the executable path in the source code, and a declaration event indicating an operation on a variable;

transitioning states of the state machine during the traversing in response to the determining that the event type in the traversed executable path is a relevant event having a relevant association to the defect or a non-relevant event having a non-relevant association to the defect in the source code;

determining related relevant events associated with the defect in the source code;

merging the related relevant events as a single relevant event;

filtering the logged events to discard the non-relevant events from the relevant events; and generating an analysis output of the filtered relevant events to indicate the defect in the source code and a cause of the defect.

9. A method as recited in claim 8, further comprising:

determining a first redundant relevant event that is associated with the defect as determined along the executable path in the source code; and determining at least a second redundant relevant event that is associated with the defect as determined along a different executable path in the source code.

10. A method as recited in claim 8, further comprising discarding the non-relevant events of the logged events.

11. A method as recited in claim 8, further comprising determining one or more of the relevant events that contribute to a duplicate defect in the source code.

12. A method as recited in claim 8, further comprising generating the events for different types of the events, comprising:

the alias event that indicates the least two variables correspond to the particular reference;

the branch event that indicates the change of executable paths in the source code;

the declaration event that indicates the operation on the variable; and a failed-assertion event that indicates the defect in the source code.

13. A method as recited in claim 8, further comprising adding additional types of the events that are utilized to determine the relevant events associated with the defect in the source code.

14. A method as recited in claim 8, further comprising:

generating a tag for each of the relevant events that indicates at least a type of the event and an importance of the event; and said filtering, prior to the generating the analysis output, one or more event types from the relevant events based on the type of the event indicated in the tag for each of the relevant events.

15. A method as recited in claim 8, further comprising:

generating a tag for each of the relevant events that indicates at least a type of the event and a message to explain the event; and communicating the message to explain the event to a developer of the source code, the message being a text message or an email message.

16. A computer-readable storage memory comprising stored instructions that are executable and, responsive to execution of the instructions by a computing device, the computing device performs operations comprising:
   traversing executable paths in source code of executable software instructions;
   logging events along the executable paths in the source code;
   determining a defect in the source code along an executable path in the source code;
   initiating a state machine that includes multiple states corresponding to different types of the events, the state machine:
      traversing through the logged events along the executable paths in the source code of executable software instructions using the state machine, the traversing starting from the defect in the source code and traversing the executable path in reverse order through the different types of the events including: branch events, alias events, and declaration events to determine one or more relevant declaration events and an associated alias event, an alias event indicating at least two variables corresponding to a particular reference, a branch event indicating a change of the executable path in the source code, and a declaration event indicating an operation on a variable;
      determining relevant and non-relevant events of the logged events that are associated with the defect in the source code during the traversing based on a current state of the state machine for a current logged event as the state machine traverses back through the logged events;
      transitioning states of the state machine during the traversing in response to determining that the event type in the traversed executable paths is a relevant event having a relevant association to the defect or a non-relevant event having a non-relevant association to the defect in the source code;
   determining which of the relevant events are redundant relevant events contributing to a duplicate defect in the source code;
   filtering the logged events to discard the redundant relevant events and the non-relevant events from the relevant events; and
   generating an analysis output of the filtered relevant events to indicate the defect in the source code and a cause of the defect.

17. A computer-readable storage memory as recited in claim 16, wherein the computing device further performs the operations comprising:
   discarding the non-relevant events of the logged events.

18. A computer-readable storage memory as recited in claim 16, wherein the computing device further performs the operations comprising:
   determining related relevant events associated with the defect in the source code; and
   merging the related relevant events as a single relevant event.

19. A computer-readable storage memory as recited in claim 16, wherein the computing device further performs the operations comprising:
   generating a tag for each of the relevant events that indicates at least a type of the event and an importance of the event; and
   said filtering, prior to the generating the analysis output, one or more event types from the relevant events based on the type of the event indicated in the tag for each of the relevant events.

20. A computer-readable storage memory as recited in claim 16, wherein the computing device further performs the operations comprising:
   generating a tag for each of the relevant events that indicates at least a type of the event and a message to explain the event; and
   communicating the message to explain the event to a developer of the source code, the message being a text message or an email message.

* * * * *